US012392096B2

(12) United States Patent
Xiong

(10) Patent No.: US 12,392,096 B2
(45) Date of Patent: Aug. 19, 2025

(54) LIGHT-EMITTING TRAFFIC CONE

(71) Applicant: CIXI SHUANGWEI ROAD FACILITIES CO., LTD., Ningbo (CN)

(72) Inventor: Wei Xiong, Ningbo (CN)

(73) Assignee: CIXI SHUANGWEI ROAD FACILITIES CO., LTD., Ningbo (CN)

( * ) Notice: Subject to any disclaimer, the term of this patent is extended or adjusted under 35 U.S.C. 154(b) by 61 days.

(21) Appl. No.: 18/540,919

(22) Filed: Dec. 15, 2023

(65) Prior Publication Data

US 2024/0175221 A1    May 30, 2024

Related U.S. Application Data

(63) Continuation-in-part of application No. PCT/CN2021/112961, filed on Aug. 17, 2021.

(30) Foreign Application Priority Data

Jun. 17, 2021    (CN) .......................... 202121345086.3

(51) Int. Cl.
| | |
|---|---|
| *E01F 9/615* | (2016.01) |
| *E01F 9/608* | (2016.01) |
| *E01F 9/619* | (2016.01) |
| *E01F 9/654* | (2016.01) |
| *E01F 9/688* | (2016.01) |
| *F21S 9/03* | (2006.01) |

(52) U.S. Cl.
CPC .............. *E01F 9/617* (2016.02); *E01F 9/608* (2016.02); *E01F 9/615* (2016.02); *E01F 9/619* (2016.02); *E01F 9/654* (2016.02); *E01F 9/688* (2016.02); *F21S 9/037* (2013.01)

(58) Field of Classification Search
CPC . E01F 9/617; E01F 9/608; E01F 9/619; E01F 9/654; E01F 9/688; E01F 9/615; F21S 9/037; F21S 9/03; H02J 7/35; Y02B 20/72
See application file for complete search history.

(56) References Cited

U.S. PATENT DOCUMENTS

| | | | |
|---|---|---|---|
| 7,878,678 B1 * | 2/2011 | Stamatatos | B60Q 1/2696 |
| | | | 116/63 P |
| 9,127,420 B2 * | 9/2015 | Ko | E01F 9/615 |
| 9,512,578 B1 * | 12/2016 | Dvoracek | E01F 9/654 |

(Continued)

FOREIGN PATENT DOCUMENTS

| | | |
|---|---|---|
| CN | 2808998 Y | 8/2006 |
| CN | 200985493 Y | 12/2007 |

(Continued)

*Primary Examiner* — John A Tweel, Jr.
(74) *Attorney, Agent, or Firm* — Bayramoglu Law Offices LLC

(57) ABSTRACT

A light-emitting traffic cone includes: a cone body, having a hollow space; a base, connected to the cone body; and a light-emitting assembly, disposed on the base, the light-emitting assembly at least including a light-emitting body and a power supply, the light-emitting body being electrically connected to the power supply, and the light-emitting body being disposed at a position corresponding to the hollow space so that light emitted by the light-emitting body can irradiate into the hollow space. The light-emitting traffic cone can improve a warning effect.

6 Claims, 3 Drawing Sheets

(56) References Cited

U.S. PATENT DOCUMENTS

2015/0116991 A1* 4/2015 Miano ..................... E01F 9/615
   362/157
2023/0340738 A1* 10/2023 Selevan ................. E01F 9/654

FOREIGN PATENT DOCUMENTS

| | | | | |
|---|---|---|---|---|
| CN | 205259093 U | | 5/2016 | |
| CN | 209114359 U | | 7/2019 | |
| CN | 211036763 U | | 7/2020 | |
| GB | 1062624 A | | 3/1967 | |
| JP | 2018141362 A | | 9/2018 | |
| KR | 20160002662 U | * | 8/2016 | ............. E01F 9/654 |
| TW | M571879 U | | 12/2018 | |

* cited by examiner

LIGHT-EMITTING TRAFFIC CONE

CROSS REFERENCE TO THE RELATED APPLICATIONS

This application is the continuation-in-part application of International Application No. PCT/CN2021/112961, filed on Aug. 17, 2021, which is based upon and claims priority to Chinese Patent Application No. 202121345086.3, filed on Jun. 17, 2021, the entire contents of which are incorporated herein by reference.

TECHNICAL FIELD

The present invention relates to the field of barricade technologies, and in particular, to a light-emitting traffic cone.

BACKGROUND

Traffic cones are widely used in roads and construction, can be used for isolation warnings in urban intersection lanes, sidewalks, and dangerous areas, and can also be used for maintenance and repair, or the like of urban roads and expressways.

However, in a low visibility environment such as at night, a cone body surface of a conventional traffic cone is usually adhered with a reflective film or covered with a reflective cone sleeve, and the reflective film is irradiated by a light fixture and then light is reflected to a pedestrian or driver's eyes to provide warning information. This is a passive warning. Once the light fixture is faulty, a risk of an accident is greatly increased. In addition, the reflective film is likely to fall off accidentally, and as the service time increases, a reflection effect of the reflective film decreases, weakening a warning effect of the traffic cone. Therefore, a traffic cone capable of improving a warning effect is needed.

SUMMARY

The present invention provides a light-emitting traffic cone, which can improve a warning effect.

To resolve the foregoing technical problem, the present invention provides a light-emitting traffic cone, including:
a cone body, having a hollow space;
a base, connected to the cone body; and
a light-emitting assembly, disposed on the base, where the light-emitting assembly at least includes a light-emitting body and a power supply, the light-emitting body is electrically connected to the power supply, and the light-emitting body is disposed at a position corresponding to the hollow space so that light emitted by the light-emitting body can irradiate into the hollow space.

According to the foregoing technical solution, preferably, the light-emitting assembly further includes an accommodating box, the power supply is connected to the accommodating box, and the accommodating box is detachably connected to the base.

According to the foregoing technical solution, preferably, the power supply is a battery or a solar power supply.

According to the foregoing technical solution, preferably, the power supply includes the battery and the solar power supply, and the battery is disposed in the accommodating box.

According to the foregoing technical solution, preferably, the base is provided with an accommodating opening, the accommodating box is clamped in the accommodating opening, the solar power supply includes a solar panel, and the solar panel is disposed on a top surface of the accommodating box.

According to the foregoing technical solution, preferably, the light-emitting body is disposed in the accommodating box, and the light-emitting body is disposed obliquely toward the hollow space so that the light emitted by the light-emitting body can irradiate into the hollow space.

According to the foregoing technical solution, preferably, the light-emitting traffic cone further includes a buzzer, and the buzzer is electrically connected to the power supply.

According to the foregoing technical solution, preferably, the light-emitting traffic cone further includes a distance sensor, the distance sensor is electrically connected to the buzzer, and the distance sensor is electrically connected to the power supply.

According to the foregoing technical solution, preferably, a reflective tape is disposed on an outer surface of the cone body.

According to the foregoing technical solution, preferably, a control switch configured to control the light-emitting assembly is disposed on the base.

The present invention provides a light-emitting traffic cone, which is provided with the light-emitting assembly, and can actively emit light, thereby effectively improving a warning effect of the traffic cone in a case of low illumination or no illumination. The light-emitting assembly is modularized and disposed detachably, and can be directly replaced if the light-emitting assembly is faulty. A plurality of light-emitting assemblies may be disposed to improve brightness, thereby improving a warning effect. The hollow space is disposed in the cone body, and a plurality of light-emitting traffic cones may be stacked, to reduce accommodating space and reduce transportation costs.

The foregoing descriptions are merely an overview of the technical solutions of the present invention. To understand the technical means of the present invention more clearly, the technical means may be implemented according to the content of this specification. In addition, to make the foregoing and other objectives, features, and advantages of the present invention clearer and easier to understand, the following describes specific implementations of the present invention.

In the figures: 1. cone body; 2. base; 3. light-emitting assembly; 4. control switch; 5. reflective tape; 6. hollow space; 7. buzzer; 8. distance sensor; 201. accommodating opening; 301. accommodating box; 302. power supply; 303. battery; 304. solar panel; and 305. light-emitting body.

DETAILED DESCRIPTION OF THE EMBODIMENTS

To make the objectives, features, and advantages of the present invention clearer and easier to understand, the following clearly and comprehensively describes the technical solutions in the embodiments of the present invention with reference to the accompanying drawings in the embodiments of the present invention. Clearly, the described embodiments are merely some rather than all of the embodiments of the present invention. All other embodiments obtained by a person skilled in the art based on the embodiments of the present invention without creative efforts fall within the protection scope of the present invention.

Figure 1:
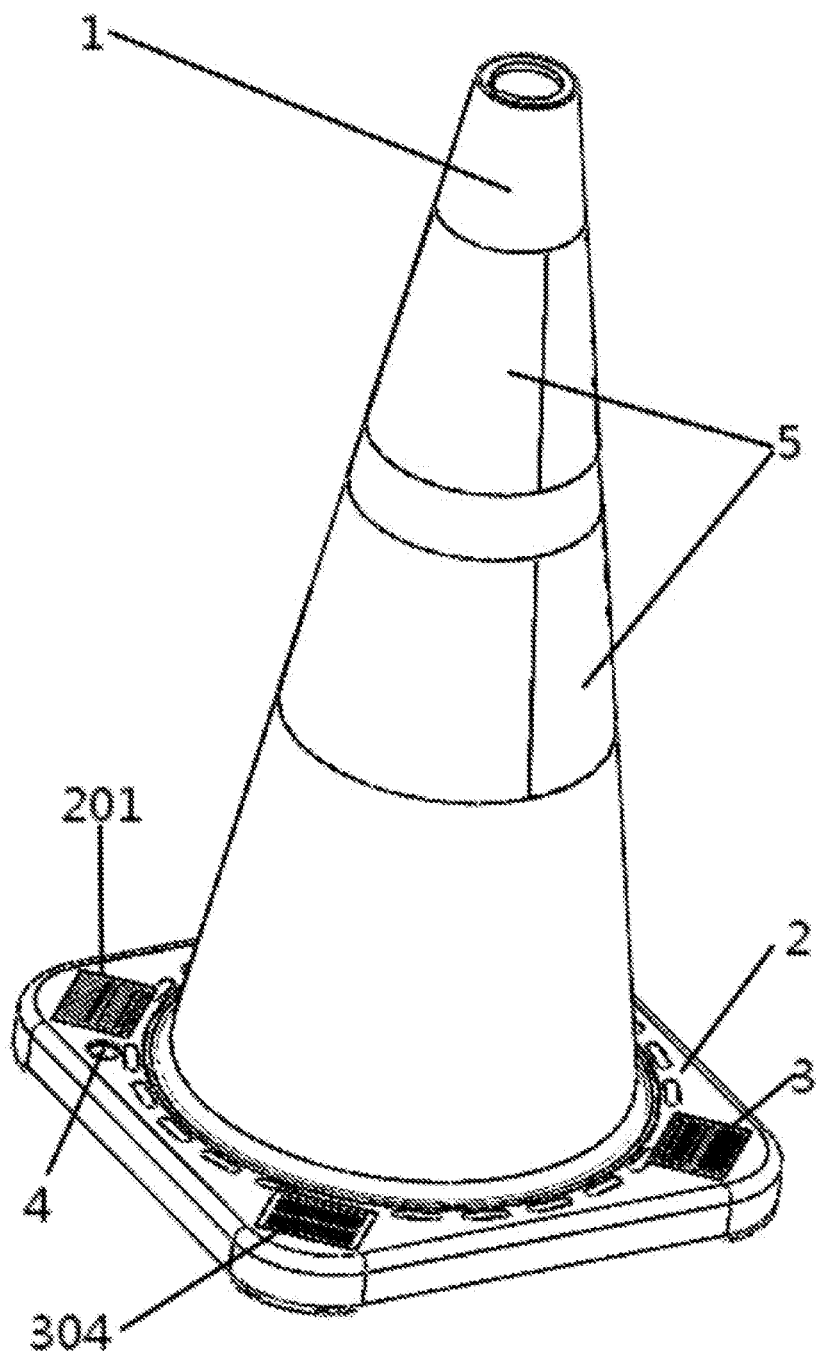
FIG. 1 is a schematic diagram of a three-dimensional structure of a light-emitting traffic cone according to an embodiment of the present invention.
Figure 2:
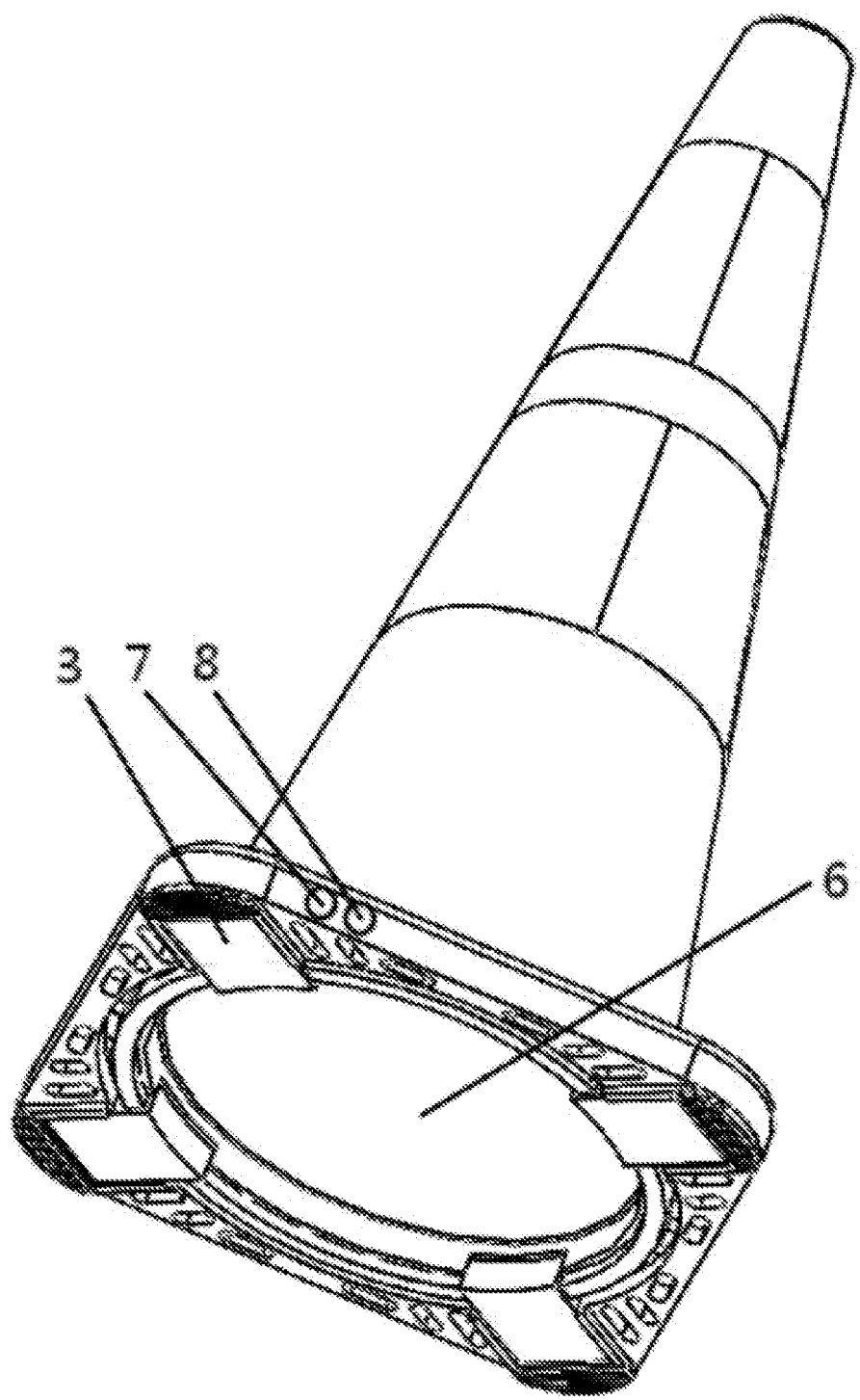
FIG. 2 is a schematic diagram of a three-dimensional structure of a light-emitting traffic cone according to an embodiment of the present invention.
Figure 3:
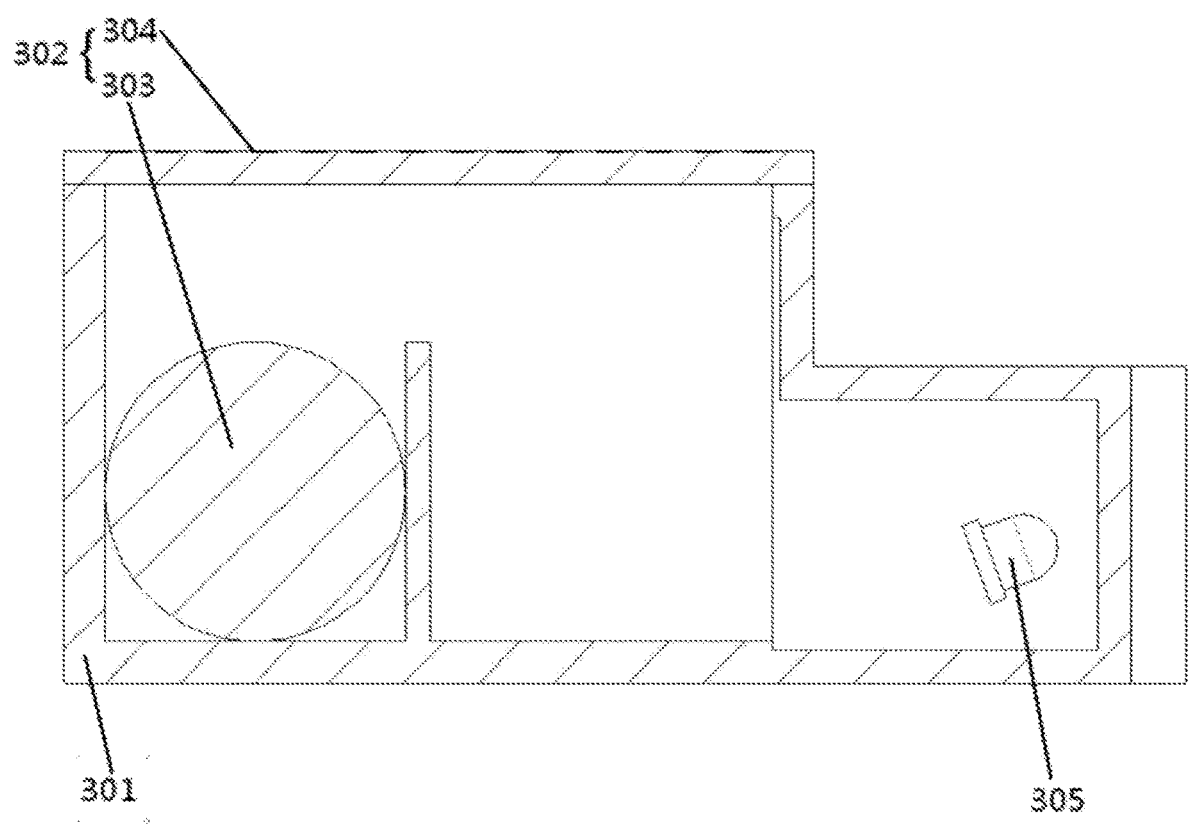
FIG. 3 is a schematic diagram of a structure of a light-emitting module of a light-emitting traffic cone according to an embodiment of the present invention.

Referring to FIG. 1 to FIG. 3, an embodiment of the present invention provides a light-emitting traffic cone, including:

a cone body 1, having a hollow space 6;

a base 2, connected to the cone body 1; and a light-emitting assembly 3, disposed on the base 2, where the light-emitting assembly 3 at least includes a light-emitting body 305 and a power supply 302, the light-emitting body 305 is electrically connected to the power supply 302, and the light-emitting body 305 is disposed at a position corresponding to the hollow space 6 so that light emitted by the light-emitting body 305 can irradiate into the hollow space 6.

This embodiment provides a light-emitting traffic cone, which is provided with the light-emitting assembly 3, and can actively emit light, thereby effectively improving a warning effect of the traffic cone in a case of low illumination or no illumination. The light-emitting assembly 3 is modularized and disposed detachably, and can be directly replaced if the light-emitting assembly 3 is faulty. A plurality of light-emitting assemblies 3 may be disposed to improve brightness, thereby improving a warning effect. The hollow space 6 is disposed in the cone body 1, and a plurality of light-emitting traffic cones may be stacked, to reduce accommodating space and reduce transportation costs.

In a further feasible manner of this embodiment, the light-emitting assembly 3 further includes an accommodating box 301, the power supply 302 is connected to the accommodating box 301, and the accommodating box 301 is detachably connected to the base 2.

In this embodiment, the accommodating box 301 and the base 2 are detachably connected, so that when the light-emitting assembly 3 is faulty, the light-emitting assembly 3 is detached for maintenance. If the fault is difficult to eliminate, the light-emitting assembly 3 can be replaced as a whole.

In a further feasible manner of this embodiment, the power supply 302 is a battery 303 or a solar power supply.

In this embodiment, the power supply 302 is the battery 303 or the solar power supply, to adapt to different use environments.

In a further feasible manner of this embodiment, the power supply 302 includes the battery 303 and the solar power supply, the battery 303 is disposed in the accommodating box 301, the solar power supply includes a solar panel 304, and the solar panel 304 is exposed to the outside of the accommodating box 301.

In this embodiment, a light-transmissive hood is disposed on a top of the solar panel 304, to prevent the solar panel from being damaged due to extrusion, and prevent rain, dust, or the like from entering the light-emitting assembly 3. The light-transmissive hood is higher than the base 2, to avoid water or dust accumulation on the light-transmissive hood, affecting power generation efficiency of the solar panel. To prevent an upper traffic cone from squeezing a light-transmissive hood of a lower traffic cone during stacking, a bottom of the accommodating box 301 is higher than a bottom of the base 2, to form accommodating space that matches a shape and a size of the light-transmissive hood, so that when a plurality of traffic cones are stacked, the light-transmissive hood can be placed in the accommodating space.

In a further feasible manner of this embodiment, the base 2 is provided with an accommodating opening 201, the accommodating box 301 is clamped in the accommodating opening 201, and the solar panel 304 is disposed on a top surface of the accommodating box 301.

In this embodiment, the accommodating opening 201 provided on the base 2 facilitates mounting of the accommodating box 301, and provides solar energy absorption space for the solar panel 304.

In a further feasible manner of this embodiment, the light-emitting body 305 is disposed in the accommodating box 301, and the light-emitting body 305 is disposed obliquely toward the hollow space 6 so that the light emitted by the light-emitting body 305 can irradiate into the hollow space 6.

In this embodiment, the light-emitting body 305 improves a warning effect of the light-emitting traffic cone through the emitted light.

In a further feasible manner of this embodiment, the light-emitting traffic cone further includes a buzzer 7, and the buzzer 7 is electrically connected to the power supply 303.

In this embodiment, the buzzer 7 is further disposed, and the buzzer 7 makes a sound to remind pedestrians, especially the blind, to pay attention to a position of the traffic cone, to prevent the blind from colliding with the traffic cone to be injured. In addition, currently, many people are accustomed to looking down at mobile phones during walking, and the buzzer 7 can also remind this group of people to pay attention to the position of the traffic cone.

In a further feasible manner of this embodiment, the light-emitting traffic cone further includes a distance sensor 8, the distance sensor 8 is electrically connected to the buzzer 7, and the distance sensor 8 is electrically connected to the power supply 303.

In this embodiment, the distance sensor is further disposed, and the distance sensor controls operation of the buzzer. If the distance sensor detects that a human body or an object approaches, the distance sensor controls the buzzer to make a sound. The distance sensor controls operation of the buzzer, which not only can warn a pedestrian, but also can prevent the buzzer from operating for a long time, resulting in a reduced service life of the buzzer.

In a further feasible manner of this embodiment, a reflective tape 5 is disposed on an outer surface of the cone body 1.

In this embodiment, the reflective tape 5 can improve a warning effect when a lighting condition is poor or a light-emitting module is faulty.

In a further feasible manner of this embodiment, a control switch 4 configured to control the light-emitting assembly 3 is disposed on the base 2.

In this embodiment, the control switch 4 can disable the light-emitting body 305 when the light-emitting assembly 3 does not need to be used, thereby effectively prolonging a service life of the light-emitting assembly 3 and reducing power consumption. A shield is disposed above the control switch 4, to effectively prevent the control switch 4 from being touched by mistake, and prevent rain or dust from entering the switch or the light-emitting assembly 3.

Specifically, in this embodiment, the light-emitting assembly 3 includes the accommodating box 301, the power supply 302, and the light-emitting body 305. The battery 303 and the light-emitting body 305 are detachably disposed inside the accommodating box 301, to facilitate maintenance and replacement. The light-emitting assembly 3 is clamped as a whole on the base 2 by using the accommodating box 301, to facilitate detachment of the light-emitting assembly 3 as a whole for maintenance and replacement. The light emitted by the light-emitting body 305 irradiates the hollow space 6 of the cone body 1. Turn-on or turn-off of the light-emitting body 305 is controlled by using the control switch 4. The control switch 4 is disposed on the base 2, and the shield is disposed above the control switch 4, to effectively prevent the control switch 4 from being touched by mistake, and prevent rain or dust from entering the switch or the light-emitting assembly 3. The cone body 1 is disposed on the base 2, and the hollow space 6 is disposed in the body 1, so that a plurality of light-emitting traffic cones of the same structure can be stacked, to reduce accommodating space and reduce transportation costs. The reflective tape 5 is disposed on the exterior of the cone body 1, to improve a warning effect when a lighting condition is poor or a light-emitting module is faulty.

In the descriptions of this specification, reference terms such as "an embodiment", "some embodiments", "example", "specific example", or "some examples" mean that specific features, structures, materials, or characteristics described with reference to the embodiments or the examples are included in at least one embodiment or example of the present invention. In addition, the described specific features, structures, materials, or characteristics can be properly combined in any one or more of the embodiments or the examples. In addition, a person skilled in the art can integrate and combine different embodiments or examples and features in different embodiments or examples described in this specification, provided that the embodiments or the examples and the features do not conflict with each other.

In addition, terms "first" and "second" are used only for description purposes, and cannot be understood as an indication or an implication of relative importance or an implicit indication of a quantity of indicated technical features. Therefore, features defined with "first" or "second" may explicitly or implicitly include at least one of the features. In the descriptions of the present invention, "a plurality of" means two or more, unless otherwise specifically limited.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A light-emitting traffic cone, comprising:
a cone body, having a hollow space;
a base, connected to the cone body; and
a light-emitting assembly, disposed on the base, wherein the light-emitting assembly at least comprises a light-emitting body and a power supply, the light-emitting body is electrically connected to the power supply, and the light-emitting body is disposed at a position corresponding to the hollow space so that light emitted by the light-emitting body is allowed to irradiate into the hollow space;
wherein the light-emitting assembly further comprises an accommodating box, the power supply is connected to the accommodating box, and the accommodating box is detachably connected to the base,
wherein the power supply comprises a battery and a solar power supply, and the battery is disposed in the accommodating box,
and wherein the base is provided with an accommodating opening, the accommodating box is clamped in the accommodating opening, the solar power supply comprises a solar panel, and the solar panel is disposed on a top surface of the accommodating box.

2. The light-emitting traffic cone according to claim 1, wherein the light-emitting body is disposed in the accommodating box, and the light-emitting body is disposed obliquely toward the hollow space so that the light emitted by the light-emitting body is allowed to irradiate into the hollow space.

3. The light-emitting traffic cone according to claim 1, further comprising a buzzer, wherein the buzzer is electrically connected to the power supply.

4. The light-emitting traffic cone according to claim 3, further comprising a distance sensor, wherein the distance sensor is electrically connected to the buzzer, and the distance sensor is electrically connected to the power supply.

5. The light-emitting traffic cone according to claim 1, wherein a reflective tape is disposed on an outer surface of the cone body.

6. The light-emitting traffic cone according to claim 1, wherein a control switch configured to control the light-emitting assembly is disposed on the base.

* * * * *